United States Patent
Cheng et al.

(10) Patent No.: US 7,839,553 B2
(45) Date of Patent: Nov. 23, 2010

(54) LIGHT SOURCE MODULE

(75) Inventors: Chu-Ming Cheng, Hsinchu (TW);
Shang-Yi Wu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 53 days.

(21) Appl. No.: 11/833,739

(22) Filed: Aug. 3, 2007

(65) Prior Publication Data
US 2008/0192464 A1    Aug. 14, 2008

(30) Foreign Application Priority Data
Jan. 31, 2007    (TW)    .............................. 96103489 A

(51) Int. Cl.
*G02B 26/02* (2006.01)
*G02B 26/00* (2006.01)
*G02B 27/14* (2006.01)
*G02B 27/10* (2006.01)

(52) U.S. Cl. .................. 359/230; 359/618; 359/629; 359/238; 359/234

(58) Field of Classification Search ................ 359/618, 359/629, 894, 230, 235, 240; 362/231; 396/493–501, 396/452–456, 463, 457, 469; 353/91, 31
See application file for complete search history.

(56) References Cited

U.S. PATENT DOCUMENTS

| | | | | |
|---|---|---|---|---|
| 4,333,722 A * | 6/1982 | Lee | ............................. | 396/449 |
| 4,558,938 A * | 12/1985 | Petersen | ...................... | 396/464 |
| 6,513,932 B1 * | 2/2003 | Ehrne et al. | .................. | 396/493 |
| 6,762,785 B2 * | 7/2004 | Roddy et al. | ................. | 347/239 |
| 6,999,245 B1 * | 2/2006 | Choi | .......................... | 359/738 |
| 7,367,682 B2 * | 5/2008 | Dvorkis et al. | .............. | 353/101 |
| 7,477,035 B2 * | 1/2009 | Lee | ............................. | 318/480 |
| 2006/0119804 A1 * | 6/2006 | Dvorkis et al. | ................ | 353/98 |
| 2006/0221309 A1 * | 10/2006 | Onishi et al. | .................. | 353/97 |
| 2007/0008502 A1 * | 1/2007 | Lee et al. | ....................... | 353/97 |
| 2007/0195288 A1 * | 8/2007 | Ahn | ............................ | 353/97 |

FOREIGN PATENT DOCUMENTS

TW    1238920    9/2005

OTHER PUBLICATIONS

Electro-Optical Products Corporation. "Tuning Fork Resonant Choppers." 2001. Dec. 17, 2008 <http://www.eopc.com/ch10_ch20.html>.*

\* cited by examiner

*Primary Examiner*—Darryl J Collins
*Assistant Examiner*—Zachary Wilkes
(74) *Attorney, Agent, or Firm*—J.C. Patents

(57) ABSTRACT

A light source module for a scanning projection apparatus is provided. The light source module includes a plurality of point light sources and at least one light blocking unit. Each point light source is capable of providing a color light beam. The color light beams are combined into a combined light beam and the colors of the color light beams are different. The at least one light blocking unit is capable of being inserted into a transmission path of at least one of the color light beams at a fixed frequency to block a portion of the color light beam.

8 Claims, 7 Drawing Sheets

LIGHT SOURCE MODULE

CROSS-REFERENCE TO RELATED APPLICATION

This application claims the priority benefit of Taiwan application serial no. 96103489, filed on Jan. 31, 2007. All disclosure of the Taiwan application is incorporated herein by reference.

BACKGROUND OF THE INVENTION

1. Field of the Invention

The present invention relates to a light source module. More particularly, the present invention relates to a light source module for a scanning projection apparatus.

2. Description of Related Art

Referring to FIGS. 1A and 1B, a conventional scanning projection apparatus 100 includes a light source module 110 and a mirror 120. According to an input signal of the image to be displayed, the scanning projection apparatus 100 makes a light beam 112 emitted by the light source module 110 incident into the mirror 120 which swings in two axial directions, and then the light beam 112 is deflected by the mirror 120, so as to sequentially project the light beam 112 to different positions on a screen 30 to form an image.

In particular, if the resolution of the image projected by the scanning projection apparatus 100 is M×N (i.e., having M×N pixels), the mirror 120 sequentially projects the light beam 112 to positions P(1,1), P(1,2), ..., P(1,N), ..., P(2,1), P(2,2), ..., P(M,N−1), and P(M,N) on the screen 30. Moreover, if the refresh frequency of the image is 60 Hz, the light source module 110 must emit (M×N) light beams 112 with different light intensities in 1/60 second.

Referring to FIG. 2, the conventional light source module 110 includes a red laser 114r, a green laser 114g, a blue laser 114b, and an X-prism 116. The red laser 114r, the green laser 114g, and the blue laser 114b respectively provide a red light 112r, a green light 112g, and a blue light 112b. Moreover, a light splitting surface 116a of the X-prism 114 reflects the blue light 112b, and lets the green light 112g and the red light 112r pass there through. A light splitting surface 116b of the X-prism 114 reflects the red light 112r, and lets the green light 112g and the blue light 112b pass there through, so as to combine the red light 112r, the green light 112g, and the blue light 112b into the light beam 112.

In view of the above, if the scanning projection apparatus 100 needs to employ the modulation of the laser intensity in the gray-scale application, the light source module 110 must sequentially emit (M×N) light beams 112 in 1/60 second according to the input signal of the image to be displayed, so the light intensity modulation frequency of the red laser 114r, the green laser 114g, and the blue laser 114b must be 60×(M× N) Hz. A resolution of 1024×768 is taken for example; the light intensity modulation frequency must exceed 47 MHz. Currently, the light intensity of the red laser 114r and the green laser 114g are adjusted by modulating the driving current at a frequency of larger than 47 MHz. However, the light intensity modulation frequency of the green laser 114g cannot reach 47 MHz. Therefore, in the conventional art, a light intensity modulator 118 is added between the green laser 114g and the X-prism 116, so as to modulate the light intensity of the green light 112g by way of external modulation.

In the conventional art, a common way of external modulation is an electro-optical modulation (EOM) of using an electro-optical crystal as the light intensity modulator 118, or an acoustic-optical modulation (AOM) of using an acoustic-optical crystal as the light intensity modulator 118. However, as it is difficult and expensive to fabricate the electro-optical crystal and the acoustic-optical crystal, the cost of the light source module 100 is increased. Furthermore, the process of employing the EOM or AOM consumes substantial amount of power (about 1 watt), which is not suitable for being applied to a scanning projection apparatus powered by batteries. In addition, the green light 112g must pass through the electro-optical crystal or the acoustic-optical crystal as a whole, which causes an additional energy loss.

SUMMARY OF THE INVENTION

The present invention is directed to a cost effective light source module capable of consuming lesser power.

Other objectives and advantages of the present invention can be further deduced through the technical features disclosed by the present invention.

As embodied and broadly described herein, an embodiment of the present invention provides a light source module for being applied to a scanning projection apparatus. The light source module includes a plurality of point light sources and at least one light blocking unit. Each point light source is capable of providing a color light beam, and the color light beams are combined into a combined light beam. The light blocking unit is capable of being inserted into and moved away from a transmission path of at least one of the color light beams at a fixed frequency to block a portion of the at least one of the color light beams. The fixed frequency refers to a light intensity modulation frequency corresponding to an image resolution and an image refresh frequency.

In the present invention, the light blocking unit is inserted into the transmission path of the color light beam at the fixed frequency to block a portion of the color light beam, so as to achieve the purpose of light intensity modulation. Compared with the light intensity modulator in the conventional art, the light blocking unit of the present invention is less expensive. Moreover, the light blocking unit consumes comparatively less power.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
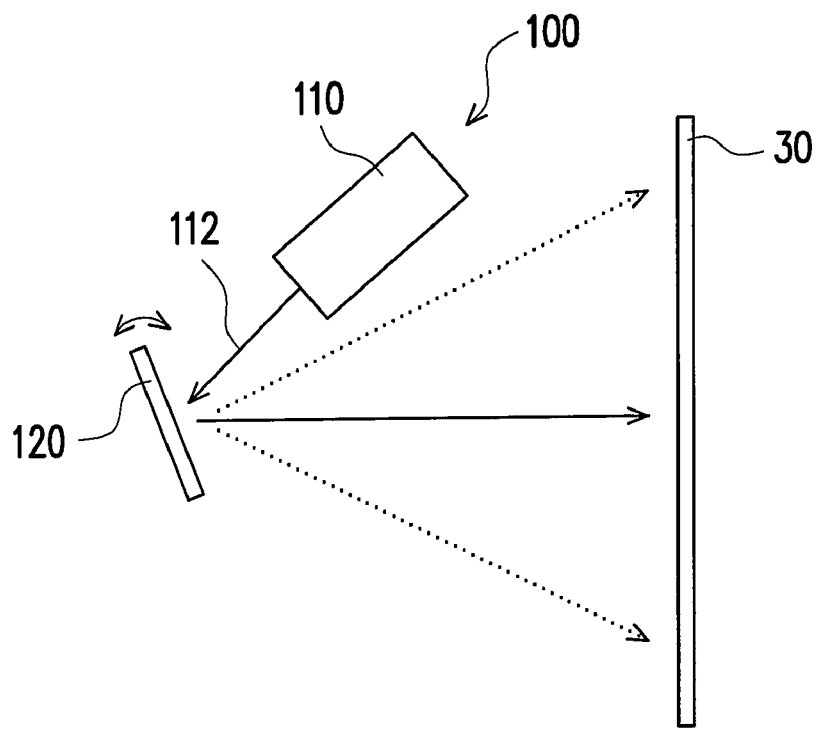
FIG. 1A is a schematic view of a conventional scanning projection apparatus.
Figure 1B:
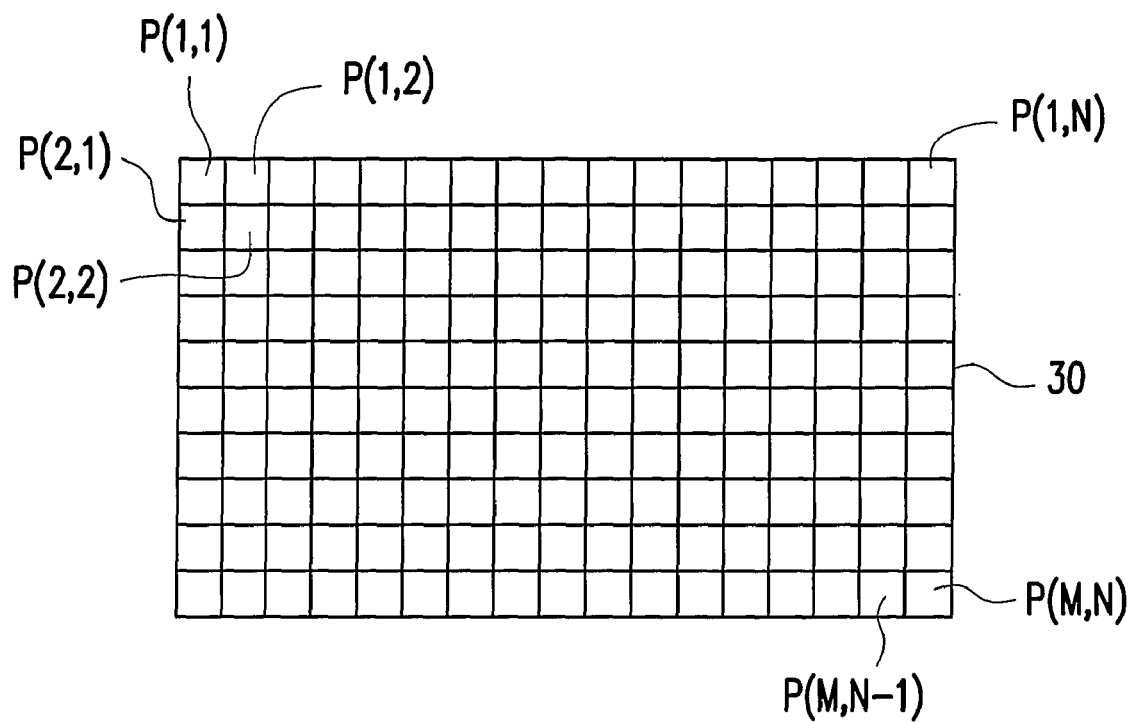
FIG. 1B is a schematic view of the scanning projection apparatus in FIG. 1A to project a light beam to different positions on a screen.
Figure 2:
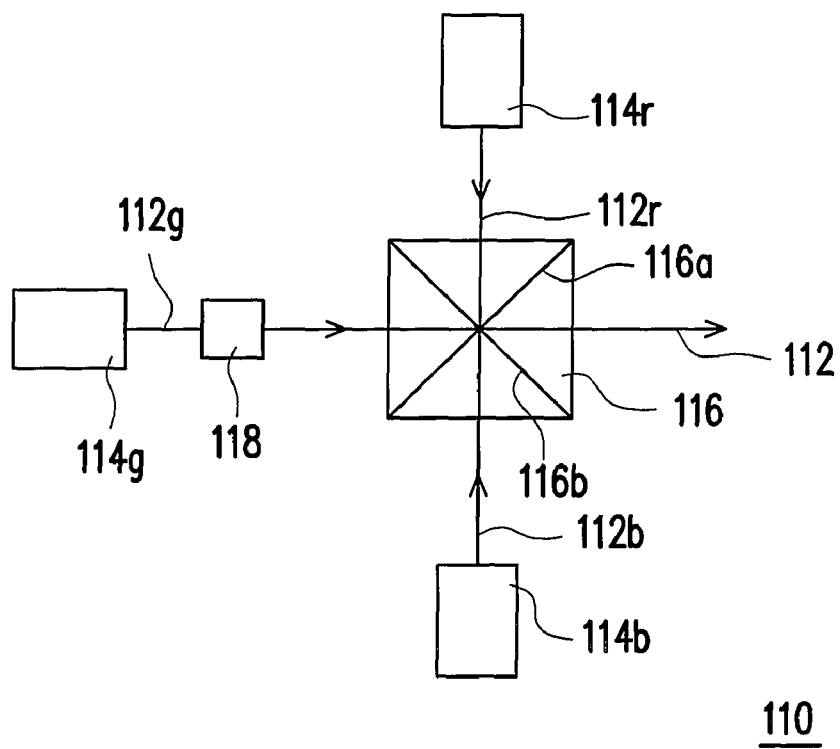
FIG. 2 is a schematic view of a light source module in FIG. 1.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

The light source module of an embodiment of the present invention is for being applied to a scanning projection apparatus. The scanning projection apparatus is defined as a projection apparatus that projects light beams sequentially to different pixel positions on an image frame according to an input signal, so as to constitute the image frame with a plurality of pixels, and then projects the image frame to a screen to form an image.

The light source module includes a plurality of point light sources and at least one light blocking unit. Each point light source is capable of providing a color light, and the color lights are combined into a combined light beam. In addition, each point light source is a light emitting diode (LED) or a laser. At least one light blocking unit is inserted into a transmission path of at least one of the color lights at a fixed frequency to block a portion of the color light. The light source module of the present invention is illustrated below through embodiments with reference to the drawings.

Figure 3:
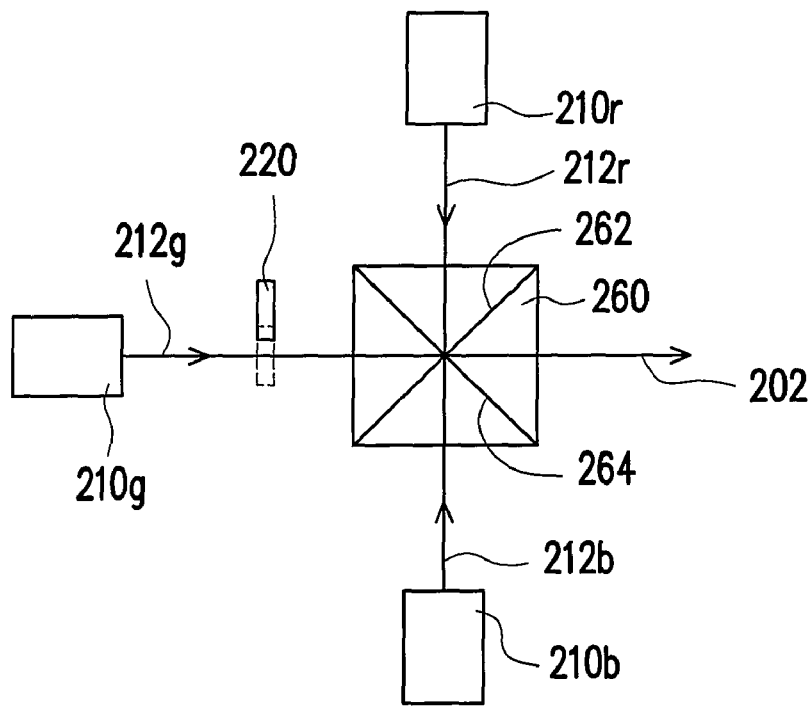
FIG. 3 is a schematic view of a light source module according to an embodiment of the present invention.

Referring to FIG. 3, the light source module 200 according to an embodiment of the present invention includes a first point light source 210g, a second point light source 210r, a third point light source 210b, a light combination unit 260, and a light blocking unit 220. The first point light source 210g is capable of providing a first color light beam 212g (for example, green light), the second point light source 210r is capable of providing a second color light beam 212r (for example, red light), and the third point light source 210b is capable of providing a third color light beam 212b (for example, blue light). The color light beams 212g, 212r, 212b are combined into a combined light beam 202, and the first color light beam 212g, the second color light beam 212r, and the third color light beam 212b have different colors.

The light combination unit 260 is capable of combining the first color light beam 212g, the second color light beam 212r, and the third color light beam 212b into the combined light beam 202. More particularly, the light combination unit 260 is, for example, an X-prism. The first point light source 210g, the second point light source 210r, and the third point light source 210b are disposed at three different sides of the X-prism so that the X-prism may combined the light beams from them to a light beam. A light splitting surface 262 of the light combination unit 260 is capable of reflecting the third color light 212b, and letting the first color light 212g and the second color light 212r pass there through. A light splitting surface 264 of the light combination unit 260 is suitable for reflecting the second color light beam 212r, and letting the first color light beam 212g and the third color light beam 212b pass there through, so as to combine the first color light beam 212g, the second color light beam 212r, and the third color light beam 212b into the combined light beam 202.

Figure 4A:
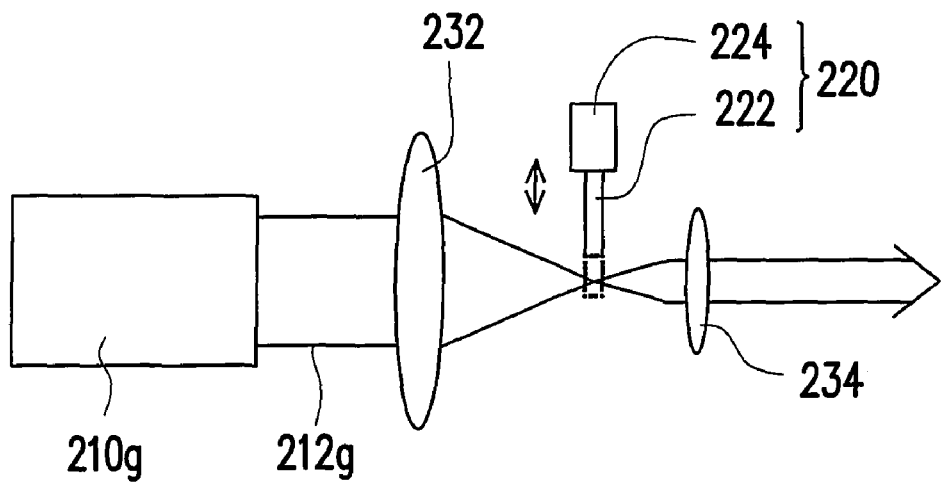
FIG. 4A is an allocation diagram of elements disposed between a first point light source and a light combination unit in FIG. 3.
Figure 4B:
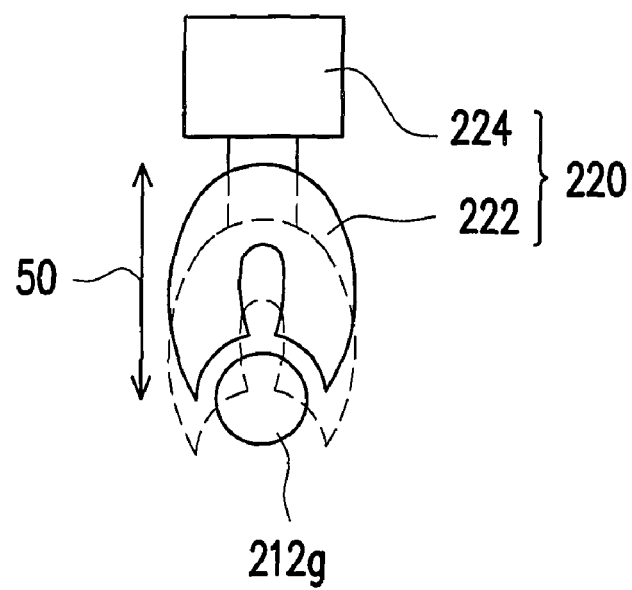
FIG. 4B is a schematic view showing the action of a light blocking unit in FIG. 4A.

Referring to FIGS. 4A and 4B, the light blocking unit 220 is disposed adjacent to the transmission path of the first color light beam 212g, and capable of being inserted into and moved away from the transmission path of the first color light beam 212g at a fixed frequency. When the light blocking unit 220 inserted into the transmission path of the first color light beam 212g, a portion of the first color light beam 212g is blocked. The fixed frequency refers to a light intensity modulation frequency corresponding to an image resolution and an image refresh frequency. For example, the image resolution is 1024×768, the image refresh frequency is 60 Hz, and thus the light intensity modulation frequency is at least 60×(1024×768) Hz, i.e., 47 MHz. The light blocking unit 220 includes a light blocking element 222 and an actuator 224 connected to the light blocking element 222. The actuator 224 may be a voice coil motor, a piezoelectric material device, or another actuator that is driven at a high frequency. The actuator 224 controls the light blocking element 222 to move back and forth along the directions indicated by an arrow 50 in FIG. 4B at a fixed frequency, so as to insert the light blocking element 222 into or move the light blocking element 222 away from the transmission path of the first color light beam 212g. Furthermore, the actuator 224 may further adjusts the moving stroke of the light blocking element 222 according to the input signal of the image to be displayed by the scanning projection apparatus, so as to control the proportion of the first color light beam 212g to be blocked each time when the light blocking element 222 is inserted into the transmission path of the first color light beam 212g.

Referring to FIG. 4A again, focusing elements 232, 234 (for example, lens) may be added in the transmission path of the first color light beam 212g for focusing the first color light beam 212g. The light blocking unit 220 is disposed adjacent to the focus point of the first color light beam 212g so as to shorten the moving stroke of the light blocking element 222.

Figure 5:
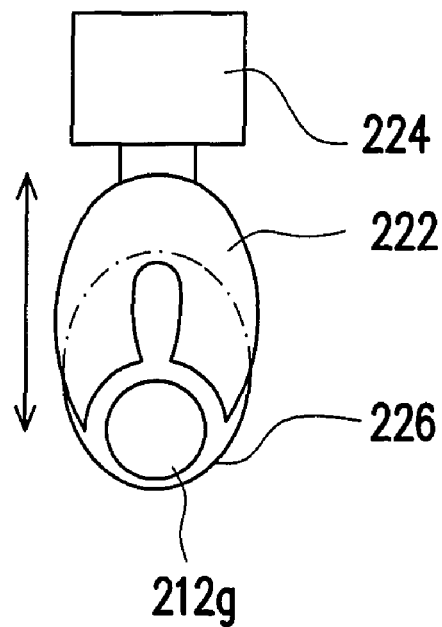
FIG. 5 is a schematic view of a light blocking unit according to another embodiment of the present invention.

Furthermore, if a laser serves as the first point light source 210g, a speckle eliminator 226 is added in the transmission path of the first color light beam 212g. In this embodiment, the speckle eliminator 226 is disposed on the light blocking element 222 (as shown in FIG. 5) for eliminating speckles. In particular, the speckle eliminator 226 may be a diffraction optical element (DOE) or a diffuser, which are not limited herein.

As for a point light source (for example, the first color light 212g) that achieves the required light intensity modulation frequency by means of the external modulation, the light blocking unit 220 with the actuator 224 provided by the present invention is inserted into or moved away from the transmission path of the first color light beam 212g at the fixed frequency to block a portion of the first color light beam 212g, and thereby making the first color light beam 212g achieve the required light intensity modulation frequency. Moreover, the components of the light blocking unit 220 in this embodiment are easily available, and their cost is lower than that of the electro-optical crystal or the acoustic-optical crystal used in the conventional art, such that the cost of the light source module 200 is reduced. Furthermore, the light blocking unit 220 consumes less power than the EOM or the AOM. In addition, the light blocking unit 220 changes the light intensity of the first color light 212g by means of being inserted into or moved away from the transmission path of the first color light 212g, so the light blocking unit 220 only blocks a portion of the first color light 212g in a unit of time, and thus the light utilization efficiency is relatively high.

Figure 6:
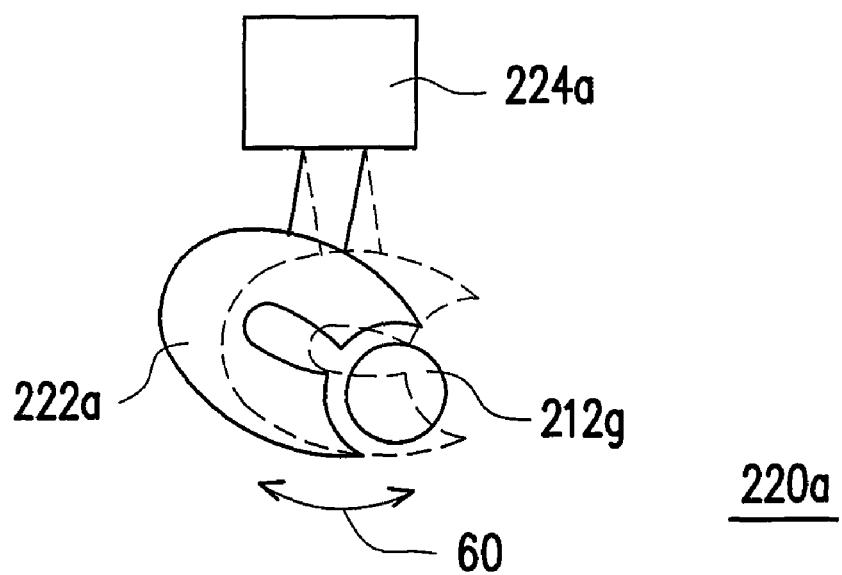
FIG. 6 is a schematic view of a light blocking unit according to still another embodiment of the present invention.

Referring to FIG. 6, a light blocking unit 220a according to another embodiment of the present invention includes an actuator 224a and a light blocking element 222a, which is different from the aforementioned light blocking unit 220 in that the actuator 224a of the light blocking unit 220a has a rotating shaft (not shown), and the light blocking element 222a is pivoted to the rotating shaft. The actuator 224a makes the light blocking element 222a swing back and forth along the directions indicated by an arrow 60, so as to insert the light blocking element 222a into or move light blocking element 222a away from the transmission path of the first color light beam 212g.

In the following figures, reference numerals the same as those in FIG. 4A refer to the same or like elements, and these elements will not be described herein again.

Figure 7A:
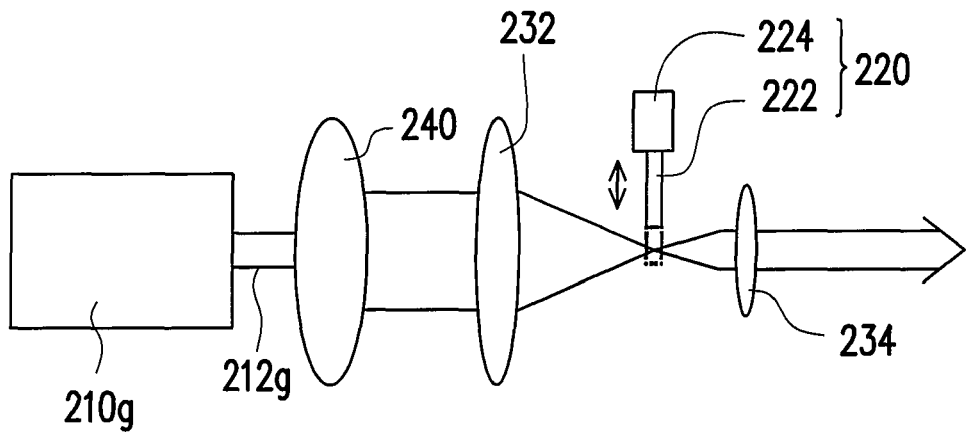
FIGS. 7A-7C are allocation diagrams of elements disposed between a first point light source and a light combination unit of a light source module according to another three embodiments of the present invention.

Referring to FIG. 7A, the light source module further includes a light diffuser 240, which is disposed in the transmission path of the first color light 212g, and located between the first point light source 210g and the focusing element 232. The first color light beam 212g is first diffused via the light diffuser 240 and then focused by the focusing elements 232, 234.

Figure 7B:
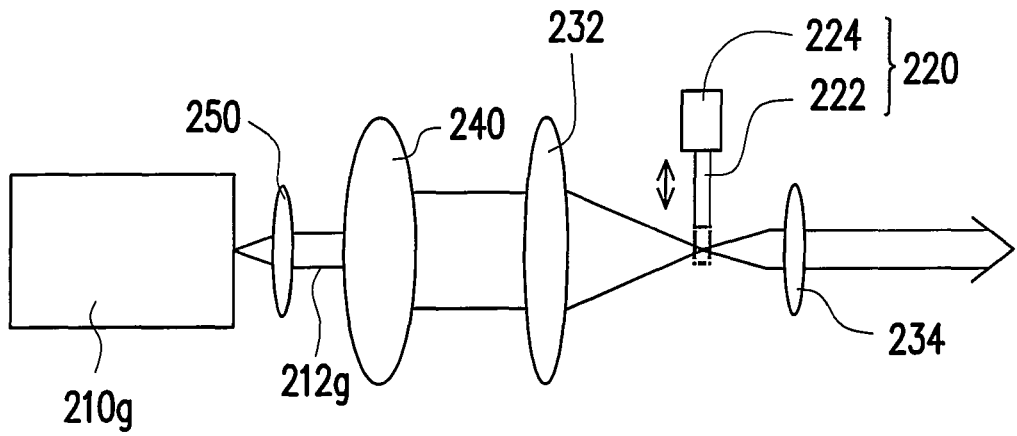

Referring to FIG. 7B, if the first color light beam 212g provided by the first point light source 210g is a non-collimated light, a collimator 250 is disposed in the transmission path of the first color light beam 212g, and located between the first point light source 210g and the light diffuser 240, such that the first color light beam 212g is converted into a collimated light beam after passing through the collimator 250.

Figure 7C:
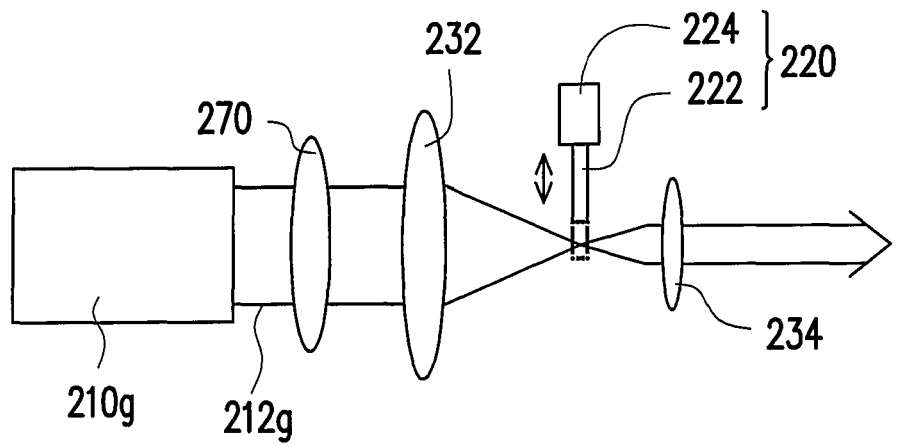

Referring to FIG. 7C, if a laser serves as the first point light source 210g, as the light energy of the first color light beam 212g provided by the laser is non-uniformly distributed, for example, Gaussian distribution, the operation of the light blocking unit 220 becomes complicated. In order to make the curve of the light intensity of the first color light 212g passing through the light blocking unit 220 and the moving stroke of the light blocking element 222 be more linear, a light uniforming element 270 is added in the transmission path of the first color light 212g, and disposed between the first point light source 210g and the light blocking unit 220. The light uniforming element 270 is capable of uniforming the distribution of the light energy of the first color light beam 212g. Moreover, as the relation curve of the light intensity of the first color light beam 212g passing through the light blocking unit 220 and the moving stroke of the light blocking element 222 is more linear, it is easier to control the moving stroke of the light blocking element 222 by means of adjusting the driving voltage or current of the actuator 224, and thus facilitating the control of the operation of the light blocking unit 220.

Figure 8A:
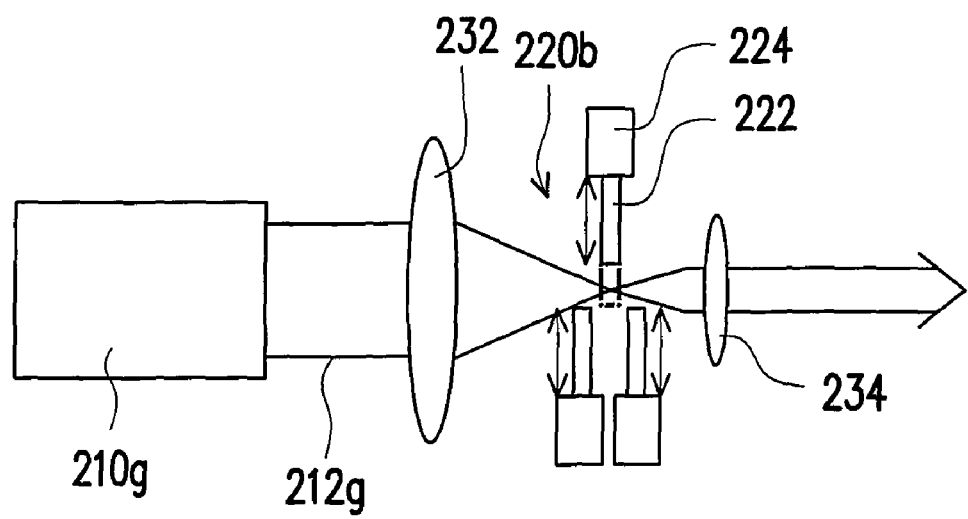
FIG. 8A is an allocation diagram of elements disposed between a first point light source and a light combination unit of a light source module according to yet another embodiment of the present invention.
Figure 8B:
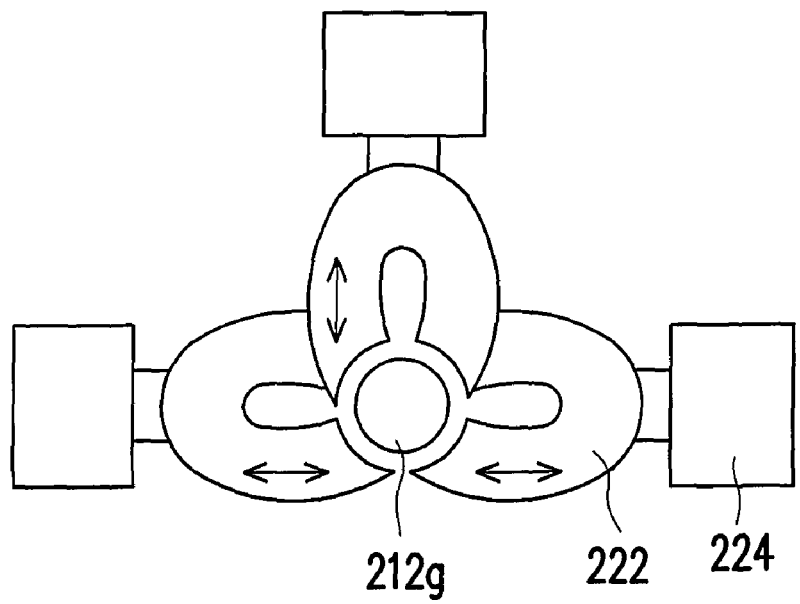
FIG. 8B is a schematic view showing the action of a light blocking unit in FIG. 8A.

In order to reduce the frequency for the actuator to drive the light blocking element, the light blocking unit may include a plurality of actuators and a plurality of light blocking elements. Referring to FIGS. 8A and 8B, the light blocking unit 220b of this embodiment includes a plurality of light blocking elements 222 and a plurality of actuators 224. Each actuator 224 is connected to a corresponding light blocking element 222, and is for controlling the operation that the light blocking elements 222 is inserted into and moved away from the transmission path of the first color light 212g at a fixed frequency, so as to block a portion of the first color light beam 212g. In addition, the actuators 224 controls the proportion of the first color light beam 212g to be blocked each time when the light blocking element 222 is inserted into the transmission path of the first color light 212g.

More particularly, when a first pixel is to be displayed by the scanning projection apparatus, one of the actuators 224 drives the connected light blocking element 222 to insert the connected light blocking element 222 into the transmission path of the first color light beam 212g, so as to adjust the light intensity of the first color light beam 212g to a desired level, and then again drives the light blocking element 222 to move away the light blocking element 222 from the transmission path of the first color light beam 212g. When a second pixel is to be displayed by the scanning projection apparatus, another actuator 224 drives the connected light blocking element 222 to insert the connected light blocking element 222 into the transmission path of the first color light beam 212g, so as to adjust the light intensity of the first color light beam 212g to a desired level, and then again drives the connected light blocking element 222 to move the light blocking element 222 away from the transmission path of the first color light beam 212g. As such, the light modulation frequency is shared by the plurality of actuators 224, and the frequency for each actuator 224 to drive the light blocking element 222 is greatly reduced, such that the actuator 224 is easily achieved. Furthermore, in this embodiment, a speckle eliminator 226 may also be disposed on each light blocking element 222 (as shown in FIG. 5).

Figure 9:
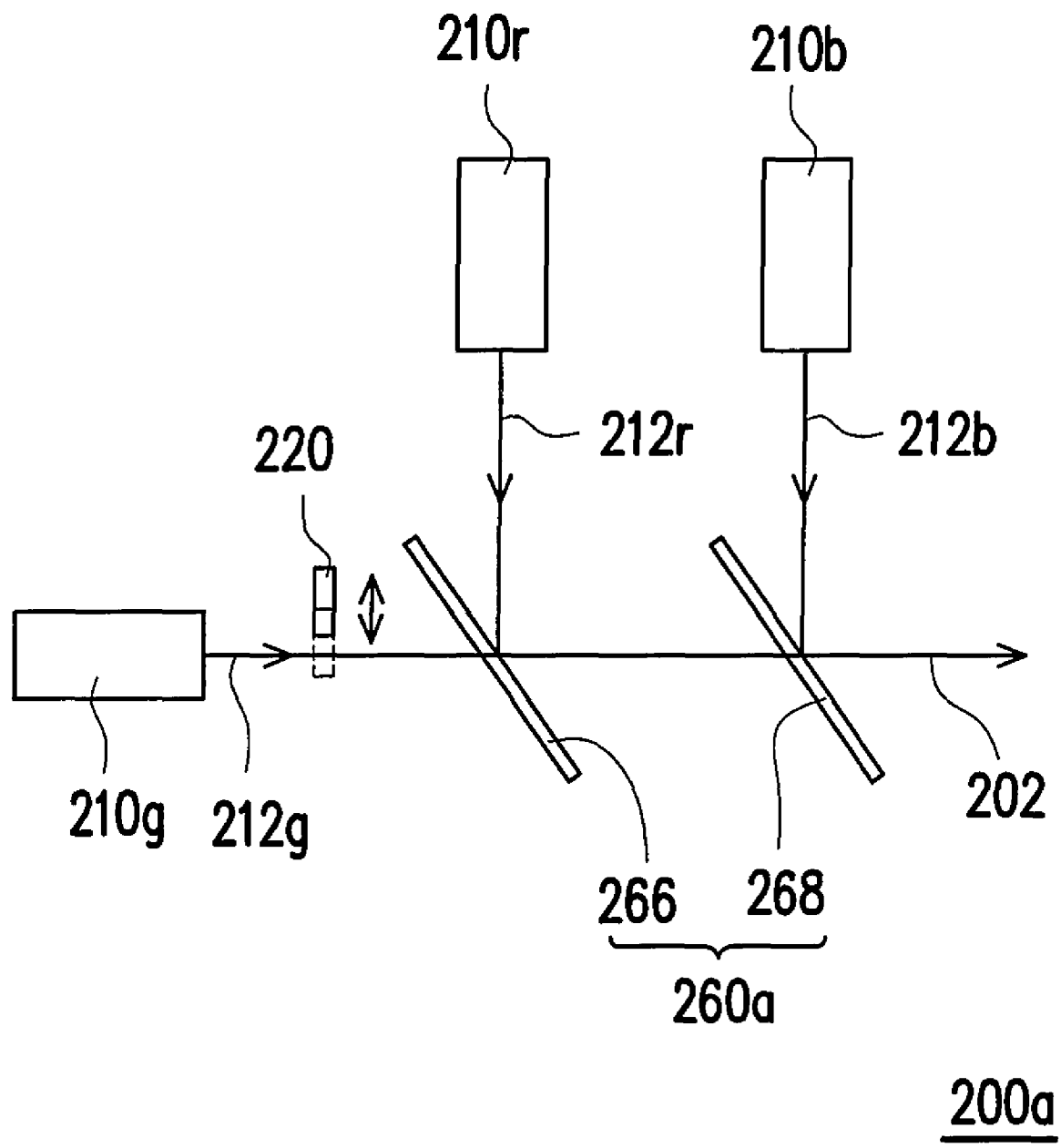
FIG. 9 is a schematic view of a light source module according to another embodiment of the present invention.

It should be noted that, the light combination manner for the first, second, and third color lights is not limited in the present invention. Another embodiment of the light source module is given below, which differs from the light source module 200 in FIG. 3 only in terms of the light combination manner. Referring to FIG. 9, a light combination unit 260a of a light source module 200a in this embodiment includes a first light splitter 266 and a second light splitter 268. The first light splitter 266 and the second light splitter 268 may be dichroic mirrors. The first light splitter 266 is disposed in the transmission paths of the first color light beam 212g and the second color light beam 212r. The second light splitter 266 is disposed in the transmission paths of the first color light beam 212g and the third color light beam 212b. Furthermore, the first light splitter 266 is capable of letting the first color light beam 212g pass there through and then be transmitted to the second light splitter 268, and reflecting the second color light beam 212r towards the second light splitter 268. The second light splitter 268 is capable of letting the first color light beam 212g and the second color light beam 212r pass there through, and reflecting the third color light beam 212b, so as to combine the first color light beam 212g, the second color light beam 212r, and the third color light beam 212b into the combined light beam 202.

In view of the above, the light source module of the present invention at least has the following advantages.

1. Compared to the conventional light intensity modulator, the cost of the light blocking unit of the present invention is lower.

2. Compared to the conventional light intensity modulator, the light blocking unit of the present invention consumes less power.

3. The portion of the first color light beam without being blocked by the light blocking unit does not cause any additional energy loss by passing through the light blocking unit, so the light utilization efficiency is higher.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, for being applied to a scanning projection apparatus, comprising:
   a plurality of point light sources, wherein each of the point light sources is capable of providing a color light beam, and the color light beams are combined into a combined light beam, the point light sources comprises:
      a first point light source, capable of providing a first color light beam;
      a second point light source, capable of providing a second color light beam; and
      a third point light source, capable of providing a third color light beam;
   a light combination unit, capable of combining the first color light beam, the second color light beam, and the third color light beam into the combined light beam; and
   a light blocking unit, disposed adjacent to a transmission path of the first color light beam, and capable of being inserted into the transmission path of the first color light beam at a fixed frequency to block a portion of the first color light beam, wherein the light blocking unit comprises:
      at least one light blocking element; and
      at least one actuator, connected to the light blocking element, for being in control of inserting the light blocking element into or moving the light blocking element away from a transmission path of the first color light beam at the fixed frequency to block a portion of the first color light beam, wherein the light blocking element has a moving stroke for being inserted into and moved away from the transmission path of the first color light beam, the fixed frequency refers to an image refresh frequency multiplied by an image resolution, distance of the moving stroke is capable of being adjusted at the fixed frequency for adjusting the proportion of the first color light beam blocked by the light blocking unit, and the second color light beam and the third color light beam are emitted to the light combination unit directly without being blocked.

2. The light source module as claimed in claim 1, wherein the at least one light blocking element is a plurality of light blocking elements, and the at least one actuator is a plurality of actuators connected to the light blocking elements respectively, for being in control of inserting the light blocking elements by turns into the transmission path of the first color light beam at the fixed frequency to block a portion of the first color light beam.

3. The light source module as claimed in claim 1, wherein the light combination unit is an X-prism.

4. The light source module as claimed in claim 1, wherein the light combination unit comprises:
   a first light splitter, disposed in transmission paths of the first color light beam and the second color light beam; and
   a second light splitter, disposed in a transmission path of the third color light beam, wherein the first light splitter is capable of letting the first color light beam pass there through and be transmitted to the second light splitter and reflecting the second color light beam towards the second light splitter, and the second light splitter is capable of letting the first color light beam and the second color light beam pass there through and reflecting the third color light beam to combine the first color light beam, the second color light beam, and the third color light beam into the combined light beam.

5. The light source module as claimed in claim 1, wherein the first point light source is a laser and the first color light beam is a green light beam.

6. The light source module as claimed in claim 1, wherein the point light sources comprise light emitting diodes or lasers.

7. The light source module as claimed in claim 1, wherein the light blocking unit is disposed adjacent to a focus point of the first color light beam so as to shorten the moving stroke of the light blocking unit.

8. The light source module as claimed in claim 1, wherein the actuator has a rotating shaft, the light blocking element is pivoted to the rotating shaft, and the actuator makes the light blocking element swing back and forth so as to insert the light blocking element into or move the light blocking element away from the transmission path of the first color light beam.

* * * * *